United States Patent [19]

Jefferson

[11] Patent Number: 5,745,596
[45] Date of Patent: Apr. 28, 1998

[54] METHOD AND APPARATUS FOR PERFORMING TEXT/IMAGE SEGMENTATION

[75] Inventor: Darrell E. Jefferson, San Jose, Calif.

[73] Assignee: Xerox Corporation, Stanford, Conn.

[21] Appl. No.: 432,215

[22] Filed: May 1, 1995

[51] Int. Cl.[6] ................................ G06K 9/34; G06K 9/48
[52] U.S. Cl. ........................ 382/176; 382/199; 358/462
[58] Field of Search ........................... 382/171, 173–177, 382/178–180, 292, 199; 358/462, 453

[56] References Cited

U.S. PATENT DOCUMENTS

| | | | |
|---|---|---|---|
| 4,504,972 | 3/1985 | Scherl et al. | 382/171 |
| 4,513,442 | 4/1985 | Scherl | 382/176 |
| 4,562,594 | 12/1985 | Bednar et al. | 382/174 |
| 5,018,024 | 5/1991 | Tanioka | 358/457 |
| 5,081,689 | 1/1992 | Meyer et al. | 382/199 |
| 5,131,049 | 7/1992 | Bloomberg et al. | 382/9 |
| 5,138,465 | 8/1992 | Ng et al. | 358/453 |
| 5,202,933 | 4/1993 | Bloomberg | 382/9 |

*Primary Examiner*—Leo Boudreau
*Assistant Examiner*—Bhavesh Mehta
*Attorney, Agent, or Firm*—Tracy L. Hurt

[57] ABSTRACT

A computer-implemented method of highlighting text regions within a first scan line signal including image regions. Text/image segmentation begins by identifying a set of edges of a possible text region within the scan line signal. Next, without reference to a second scan line signal, it is determined whether the set of edges of the possible text region first form a text region. If the set of edges form a text region, then the average pel intensity value of the text region is calculated. Afterward, the intensity values of those pels within the text region whose values differ from the average are modified.

4 Claims, 4 Drawing Sheets

METHOD AND APPARATUS FOR PERFORMING TEXT/IMAGE SEGMENTATION

FIELD OF THE INVENTION

The present invention relates to image processing. More particularly, the present inventions relates to a method of distinguishing text areas from image areas on a scan line by scan line basis and highlighting text areas.

BACKGROUND OF THE INVENTION

Raster images are represented as a series of scan line signals. Each scan line signal represents a single horizontal strip across an image by a number of picture elements, or pels, each of which possesses a location within an imaginary grid and a value. Pel level indicates a gray tone that can vary between white and black. Eight bits are used to represent the pel level, which allows the level to vary between 0 and 255. Typically, 0 is chosen to represent black and 255 to represent white. In other words, the lower its level, the darker the pel.

Many documents represented by scan line signals include both text and graphics or images. The ability to identify and segregate text and graphics is important in many image processing applications. For example, creating a high quality reproduction requires treating text and graphics differently. Graphic regions are more pleasing visually and convey greater visual information if they are represented by, and displayed as, a continuously varying range of gray tones. In contrast, text regions are more easily visually distinguished when represented by, and displayed in, only two, high-contrast, tones. Identification of text and image regions of a document is generally known as text/image segmentation.

Some prior methods of text/image segmentation distinguish between the text and image regions by attempting to identify shapes representative of graphics. This requires analyzing multiple scan line signals, and possibly all scan line signals representing a document. As a consequence, prior methods of text/image segmentation require large amounts of memory to buffer multiple scan line signals while they are being analyzed. These prior methods of text image segmentation also require a large processing time commitment. Other prior methods of text image segmentation take different approaches to identifying text from graphics, but like the methods previously discussed these methods also require large amounts of processing time and memory.

SUMMARY OF THE INVENTION

An object of the present invention is to reduce the memory required to distinguish between text and image regions of a document represented by scan line signals.

Another object of the present invention is to provide a method of highlighting text regions of a scan line signal that works as well for white text on a black background as for black text on a white background, without distinguishing between the two.

A computer-implemented method of highlighting text regions within a first scan line signal including image regions will be described. The method begins by identifying a set of edges of a possible text region within the first scan line signal. Next, without reference to a second scan line, it is determined whether the set of edges of the possible text region of the first scan line signal represent the bounds of a text region. If so, then an average pel intensity value is calculated for the text region. Afterward, the intensity of those pels within the text region whose values differ from the average of the text region are modified to produce a modified scan line signal. As a result, when the modified scan line signal is used to reproduce the scan line, the text is highlighted.

Other objects, features, and advantages of the present invention will be apparent from the accompanying drawings and detailed description that follows.

BRIEF DESCRIPTION OF THE DRAWINGS

The present invention is illustrated by way of example and not by way of limitation in the figures of the accompanying drawings. In the accompanying drawings similar references indicate similar elements.

DETAILED DESCRIPTION OF THE PREFERRED EMBODIMENTS

Figure 1:
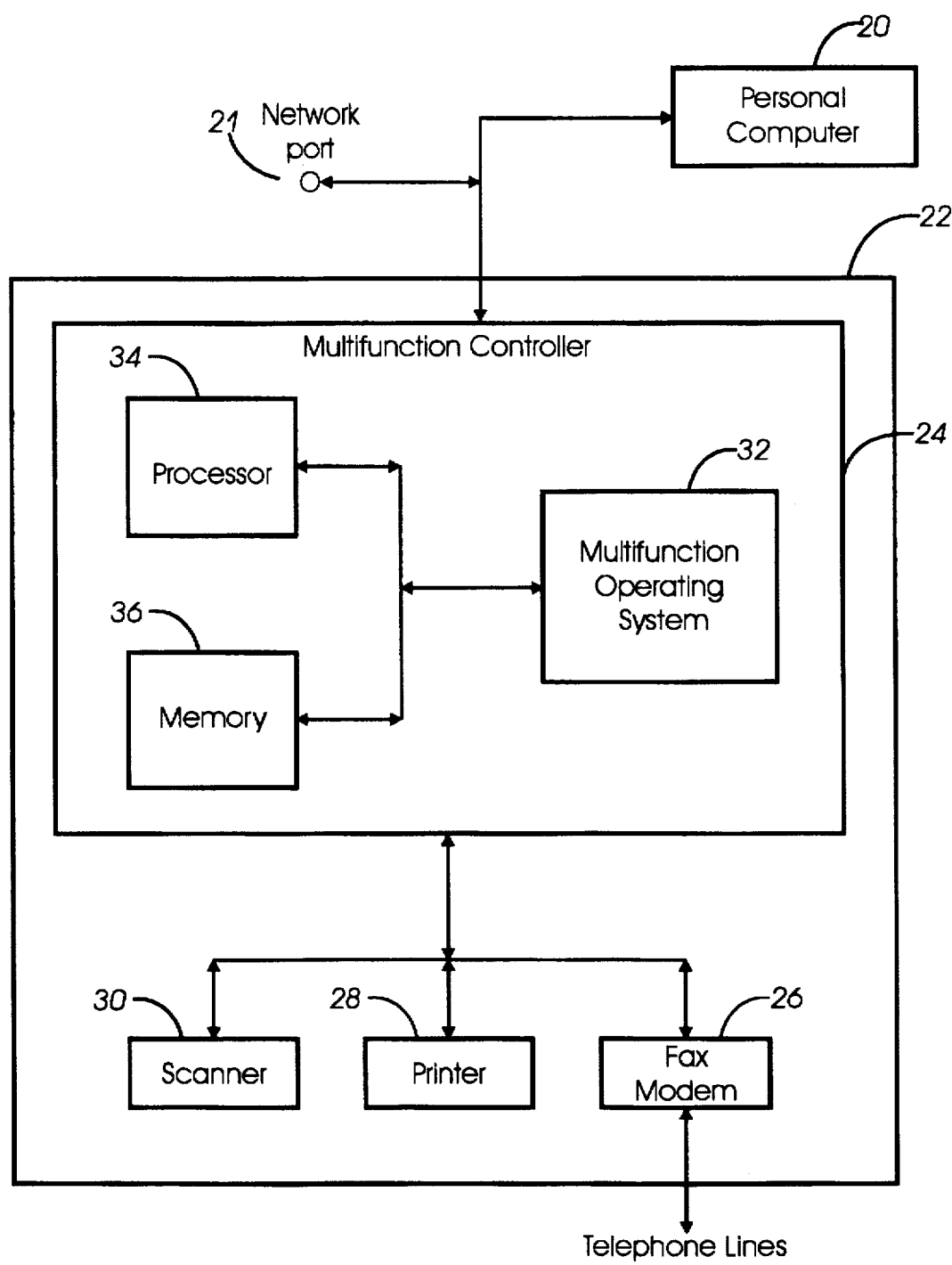
FIG. 1 is a block diagram of a multifunction device that performs the present method of performing text/image segmentation.

The block diagram of FIG. 1 illustrates multifunction device 22, which enables a user of personal computer 20 to move easily between paper and electronic representations of a document. Multifunction device 22 also improves the quality of documents while they are being transferred to paper. Multifunction device 22 does so using the method of the present invention text/image segmentation. According to the present method of text/image segmentation and text, highlighting is performed one scan line at a time.

I. System Overview

Prior to beginning a more detailed discussion of the present method, consider the environment in which the present method is intended to operate. Multifunction device 22 prints documents, copies documents, as well as transmitting and receiving facsimile documents. Multifunction device 22 performs these tasks via multifunction controller 24, fax modem 26, scanner 28, and printer 30. Though not shown, multifunction device 22 may also include an additional display device such as a cathode ray tube (CRT). Multifunction controller 24 controls the operation and cooperation of input/output devices 26, 28, and 30 using multifunction operating system 32. Multifunction operating system 32 selects appropriate command sequences, which it passes to processor 34 for execution. Multifunction operating system 32 may be realized as software stored within a memory device. Preferably, the software used to realize multifunction operating system 32 is Microsoft at Work™.

Fax modem 26, scanner 30, printer 28, network port 21, and multifunction controller 24 represent the documents that they handle using scan line signals. Scanner 30 generates scan line signals from the images on a hard-copy document, while printer 28 marks images on a marking medium using scan line signals. Fax modem 26 and multifunction controller 24 use scan line signals received from personal computer 20, network port 21, telephone lines, printer 28, or scanner 30 to enable movement of information between electronic media and paper.

The functionality of multifunction operating system 32 is enhanced by calls to additional processes, including that of the present method. Those processes are preferably realized using instructions executed by processor 34 and stored in object code form within memory 36. Memory 36 can be realized using solid state memory devices such as read only memories (ROM), random access memories (RAM), dynamic random access memories (DRAM), programmable read only memories (PROM), erasable programmable read only memories (EPROM), and electrically erasable programmable read only memories (EEPROM), such as flash memories.

The present method of text/image segmentation is not limited to use in multifunction devices. This method also can be used in conjunction with any device including memory and a processor using scan line signals. Thus, for example, the present method may be implemented within personal computer 20, a fax machine, or within a sophisticated copy machine.

Figure 2A:
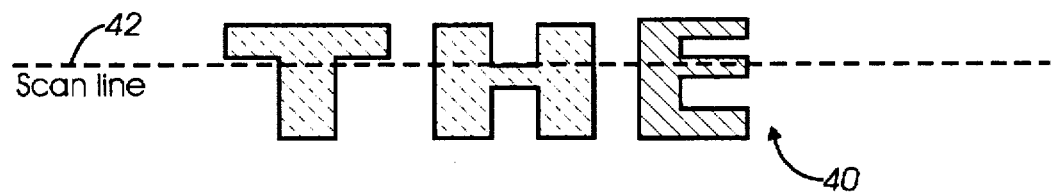
FIG. 2A illustrates a text region and a scan line across it.
Figure 2B:
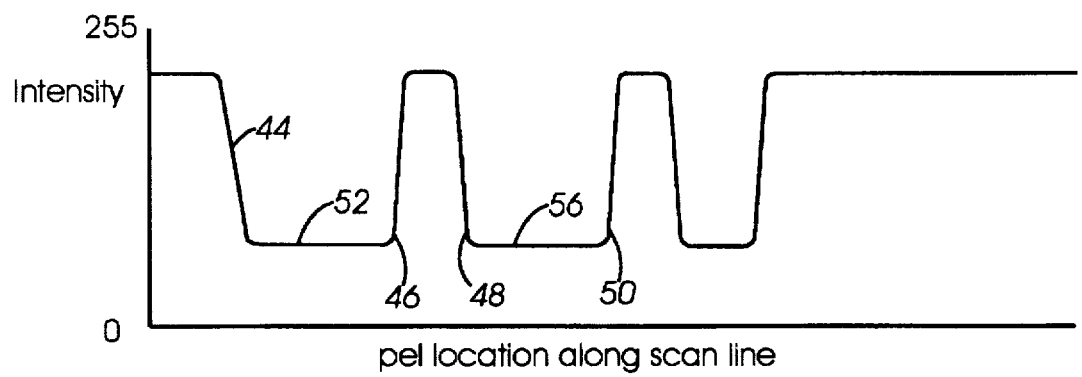
FIG. 2B is a graph of pel intensity versus pel location for the scan line across the text region of FIG. 2A.
Figure 2C:
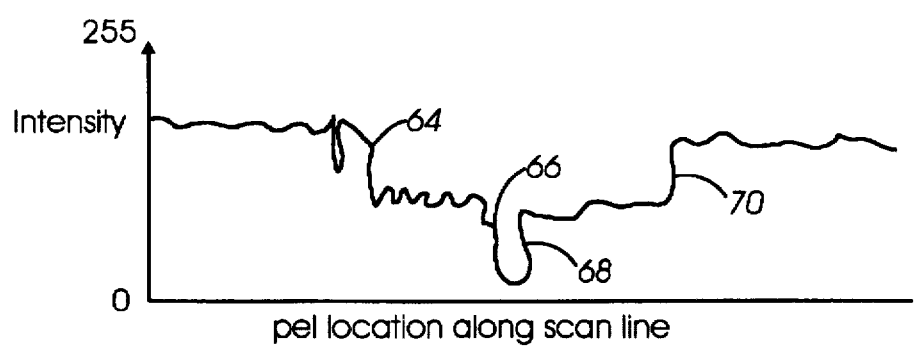
FIG. 2C is a graph of pel intensity versus pel location for a scan line across the image region of FIG. 2D.
Figure 2D:
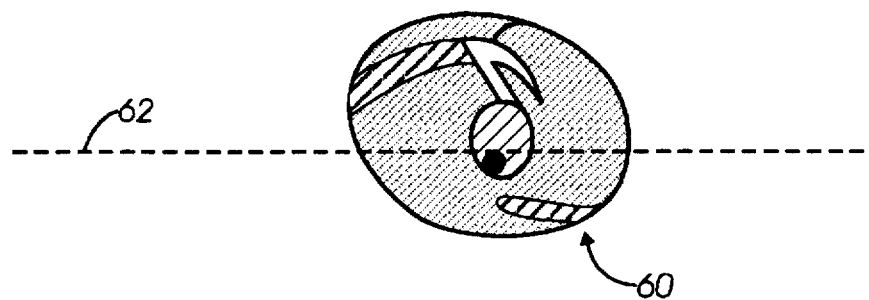
FIG. 2D illustrates an image region and a scan line across it.

As stated previously, multifunction controller 24 improves the readability of text regions by highlighting them. Multifunction controller 24 performs this task a scan line signal at a time without reference to surrounding scan lines. Multifunction controller 24 searches each scan line signal for a set feature to distinguish text regions within a scan line signal from image regions. Discussion of those features of a scan line signal that distinguish text regions from image regions is aided by FIGS. 2A, 2B, 2C, and 2D. FIG. 2A illustrates a small text region 40 whose representation requires several scan lines. Line 42 represents a single scan line across text region 40. FIG. 2B graphs intensity values for the scan line signal representing scan line 42 versus pel location. Each letter of text within text region 40 includes two edges. For example, edges 44 and 46 represent the change in color between the "T" and its background. Additionally, adjacent edges within FIG. 2B differ in polarity. For example, reading FIG. 2B from left to right, the polarity of edge 44 is falling, the polarity of edge 46 is rising, the polarity of edge 48 is falling, the polarity of edge 50 is rising, and so on. FIG. 2B also includes an area of substantially constant intensity value, a mesa, between each pair of edges. For example, mesa 52 is located between edges 44 and 46. The end of text characters in text is marked by a long distance without an edge, such as area 58. In contrast, consider the features of FIG. 2D. FIG. 2C graphs intensity values versus pel location for scan line 62 across image region 60, illustrated in FIG. 2D. Representation of image region 60 requires several scan lines. FIG. 2C also includes edges, such as 64, 66, 68 and 70. The polarity of adjacent edges is not always different. For example, reading the graph of FIG. 2C from left to right the polarity of both edges 64 and 66 is falling, the polarity of edges 66 and 68 differs, and the polarity of both edges 68 and 70 is rising. The graph of FIG. 2C includes areas between edges in which the change in intensity is not large, but is not constant. Thus, given FIGS. 2B and 2C text regions possess at least three characteristics. First, a text region is bounded by at least two edges. Second,the last edge of a text region may be indicated by a long distance 58 without an edge or a large, gradual increase in pel intensity. Third, within a text region alternating edges have different polarity.

II. Method of Text/Image Segmentation

Figure 3:
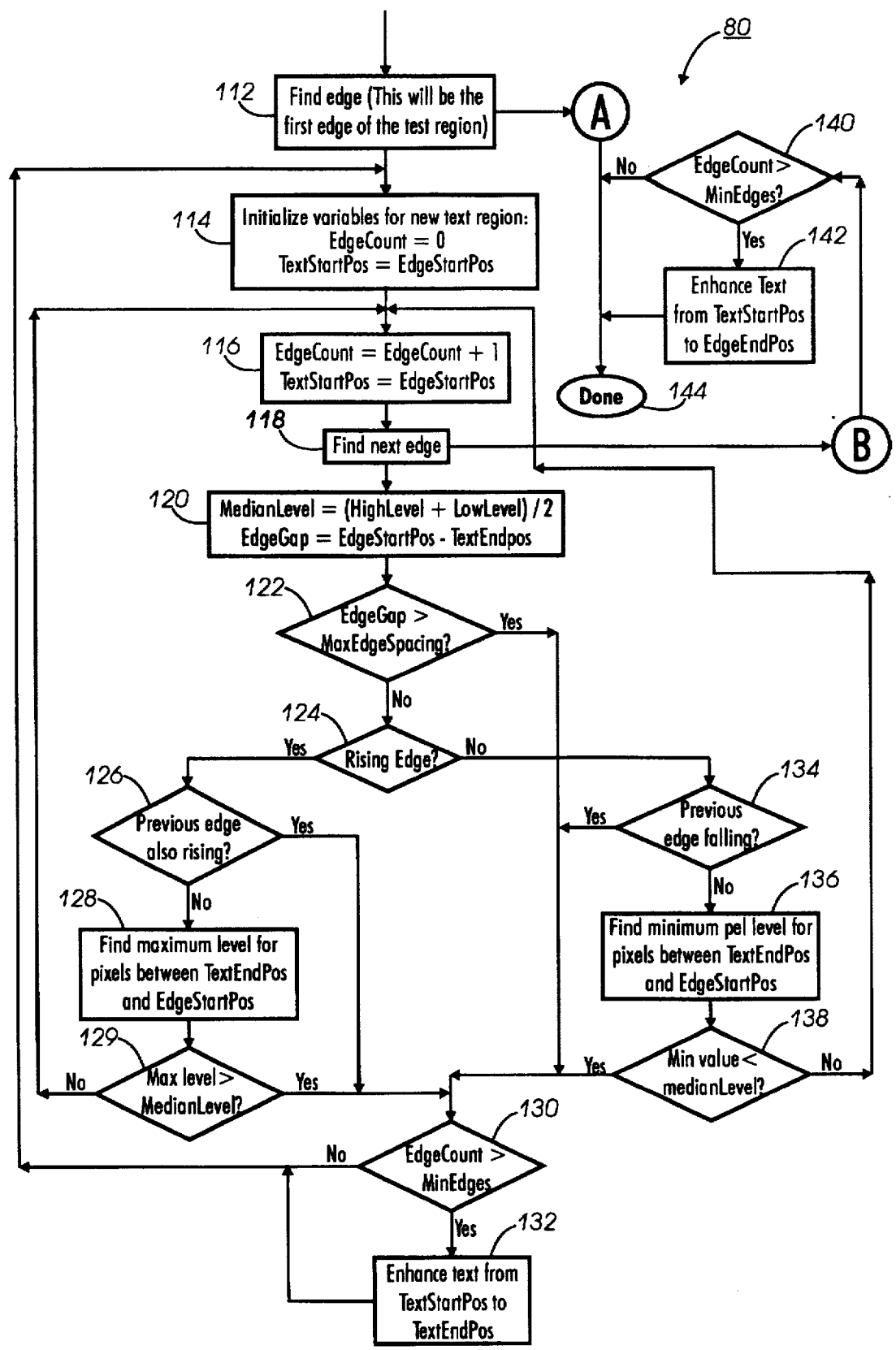
FIG. 3 is a flow diagram of a method of identifying and highlighting text regions within a scan line including image regions.

The flow diagram of FIG. 3 illustrates process 80 used by processor 34 to identify and highlight text regions of a scan line signal that also includes image regions. Process 80 is stored in object code form in memory 36. Briefly described, when executed process 80 transforms an input scan line signal into a modified scan line signal whose text regions, when displayed, are highlighted as compared to those of the input scan line. First, during step 112 processor 34 searches for a possible starting edge of the first text region. During step 114 processor 34 initializes variables for a new text region. Subsequently, during step 116, processor 34 responds to the discovery of an edge by incrementing its edge count and adjusting a pointer to the end of the text region. Processor 34 searches for another edge during step 118. After finding another edge, processor 34 determines during steps 120–124 and either steps 126–129 or steps 134–138 whether the edge just located is part of a text region. That is to say, processor 34 determines whether the edge just discovered is close enough to the closest, adjacent edge, is the right polarity, and whether the change in pel level within the gap between edges is acceptable. If so, processor returns to step 116 and continues to search for the ending edge of the current text region. After identifying the ending edge of the current text region, during step 132 processor 34 highlights the text within the region by altering the values of pels whose levels differ from the average level within the region. Processor 34 thereafter returns to step 114 and continues searching for text edges until every pel of the scan line has been examined.

A. Locating a Starting Edge

Figure 4:
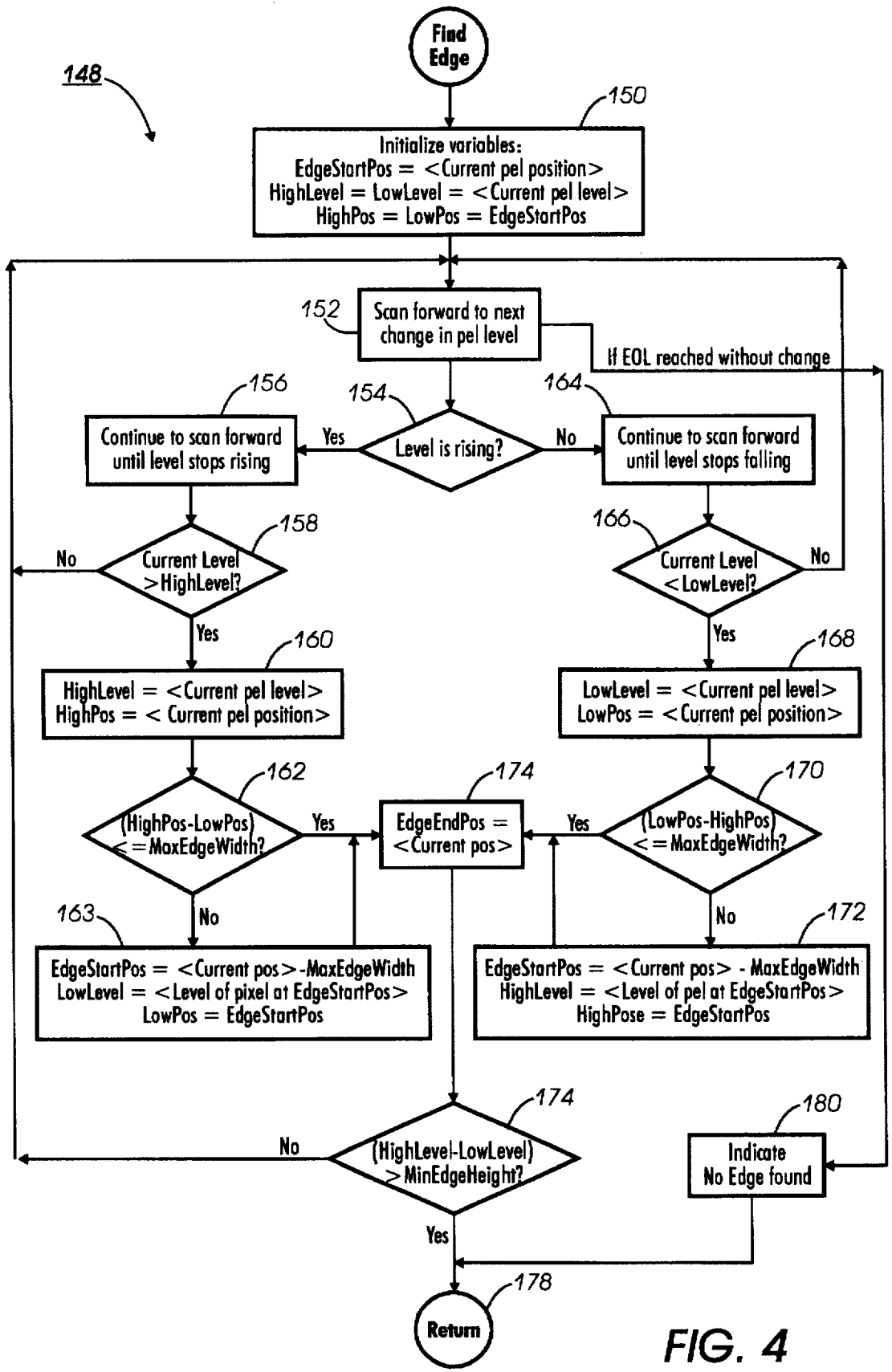
FIG. 4 is a flow diagram of a method of locating an edge.

As stated in the overview, instructions 80 begin by demanding processor 34 locate the first edge defined by the input scan line. Processor 34 locates that first edge during step 112 by executing instructions 148. Processor 34 also uses instructions 148 to locate all of the edge of the input scan line. Instructions 148 may be stored in memory 36 or within some other machine readable medium. Instructions 148 are illustrated in flow diagram form in FIG. 4

Briefly, efforts to locate an edge by executing instructions 148 begin with scanning the scan line until some change in pel level is detected. Next, processor 34 determines whether the pel level is rising or falling. Processor 34 then continues scanning the scan line until the level stops rising or falling, as may be the case. If at this point the current pel level is outside the appropriate bound, then processor 34 investigates the possibility that an edge has been discovered. Processor 34 has discovered an edge if the change in pel level is sharp enough and great enough. Having located an edge, processor 34 returns to the appropriate step, step 114 or step 120, as appropriate.

Processor 34 prepares for its edge search during step 150 by initializing a number of variables. Processor 34 tracks the starting position of the edge using EdgeStartPos, which is initialized to the current pel position. Processor 34 tracks the position of the highest intensity level along the edge using HighPos and the position of the lowest intensity level along the edge using LowPos. Processor 34 initializes both HighPos and LowPos to the position of the current pel. Processor 34 also tracks the high level and low level along the edge using HighLevel and LowLevel. During step 150 both variables are initialized to the value of the current pel level. Initialization of these variables complete, processor 34 advances to step 152 from step 150.

During step 152 processor 34 determines whether the level of the next pel in the scan line differs from the level of the current pel. Processor 34 continues scanning pels until a change in pel level is detected or the end of the scan line is reached. Consider first the actions dictated by instructions 148 when a change in pel level is detected before the end of the scan line. In response, processor 34 advances to step 154 to determine whether the change of intensity level discovered during step 152 is rising or falling. Processor 34 reacts similarly whether the intensity level is falling or rising, consequently, description of steps 156–163 also illustrates the response to a falling intensity level dictated by steps 164–172, which will not be discussed. Having determined that the edge may be rising, processor 34 branches from step 154 to step 156. During step 156 processor 34 continues scanning the scan line until the level stops rising. Processor 34 branches from step 156 to step 158 when it discovers that the level is no longer rising or it reaches the last pel of the scan line.

Processor 34 performs the first of its tests to determine whether it has located an edge during step 158. Processor 34 compares the level of the current pel to HighLevel during step 158. If the level of the current pel is not greater than HighLevel, processor 34 has not discovered the anticipated rising edge. In response, processor 34 exits step 158 and returns to step 152 to continue its search for an edge. On the other hand, if the level of the current pel exceeds HighLevel, then processor 34 advances to step 160. During step 160 processor 34 adjusts values associated with a rising edge to reflect discovery of a higher level along the edge. That is to say,160 processor 160 processor 34 sets HighLevel equal to the level of the current pel and HighPos equal to the position of the current pel. Processor 34 then exits step 160 and advances to step 162.

With step 162 processor 34 performs the first of two tests which determine whether the level increase just discovered satisfies the slope required of an edge. Identification of an edge requires a difference in level of at least MinEdgeHeight between two pels located no further than MaxEdgeWidth from each other. In one embodiment MinEdgeHeight is set to 64 and MaxEdgeWidth is set to 7. This defines edges overly inclusively; that is to say, using these values processor 34 will identify many non-text edges. As a result, additional criteria need to be used to reliably identify text regions. When using a less inclusive edge definition these other criteria may not be needed to identify text regions. Edge definition can be tailored to particular performance requirements.

During step 162 processor 34 compares the difference in position between LowPos and HighPos to MaxEdgeWidth. If the edge width is greater than MaxEdgeWidth, processor 34 advances to step 163 from step 162 to consider the possibility that the beginning of the edge was defined too soon. During step 163 processor 34 changes EdgeStartPos to the difference between the current pel position and MaxEdgeWidth. Additionally, processor 34 adjusts LowLevel and LowPos so that they represent the position and level of EdgeStartPos. That done, processor 34 advances to step 174 from step 163. Processor 34 reaches step 174 directly from step 162 when the edge width is less than MaxEdgeWidth. Processor 34 sets EdgeEndPos, equal to the current pel position. Afterward, processor 34 branches to step 176from step 174.

During step 176 processor 34 performs a second edge test. Processor 34 determines whether the change in edge level is sufficient by comparing the difference between HighLevel and LowLevel to MinEdgeHeight. If the difference is less than MinEdgeHeight, the change in level detected does not represent an edge. In response, processor 34 returns to step 152 to continue its search for an edge. On the other hand, if the difference in level of the edge exceeds MinEdgeHeight, then processor 34 advances to step 178, thereby returning to the appropriate step of instructions 80.

One feature of instructions 148 remains to discussed: response to reaching the last pel of the scan line. Processor 34 may discover the last pel during steps 152, 156, or 164. If no change in level is discovered during step 152 before reaching the last pel then no edge was found, and processor 34 advances to step 180. Processor 34 indicates that no edge was found and then branches to step 178 to return to step 112 or 118, as appropriate. In contrast, no special action is required if the last pel is retrieved while scanning during steps 156 or 164. For example, if it is discovered during step 156 that no pels remain for examination, processor 34 responds as if the level had stopped rising and advances to step 158. Processor 34 then executes the instructions in the manner previously described until reaching step 178, causing a return to either step 112 or 118.

B. Locating the Ending Edge of a Text Region

When beginning the search for the first possible text region, processor 34 branches to step 114 from step 112. With step 114 processor 34 prepares for the search by initializing variables. First, processor 34 initializes to zero its edge counter, EdgeCount. Processor 34 also sets the text start position, TextStartPos, to the position of the starting edge of the new text region, EdgeStartPos. Processor 34 then advances to step 116. Processor 34 adjusts other variables during step 116 to reflect its recent discovery of an edge. Processor 34 increments EdgeCount and sets the text end position, TextEndPos, equal to the end of the edge just discovered, i.e. to EdgeEndPos. As a result, the text region now extends from the start of the first edge found to the end of the last edge discovered. That done, processor 34 advances to step 118.

Processor 34 searches for another edge during step 118 by executing instructions 148, which were discussed in detail previously. When it discovers another edge, processor 34 advances to step 120 from step 118.

With step 120 processor 34 prepares to perform two tests of the acceptability of the edge: edge gap and gap level. The gap between adjacent edges is checked because within text regions adjacent edges tend to be located close to one another. Thus, an edge is unlikely to be part of a text region if it is located too far from the previous edge. The distance, MaxEdgeSpacing, chosen as too great a distance between adjacent edges is a design choice that depends upon the largest font size likely to be greatly effected by dithering. The level within the edge gap is checked because within text regions the level tends to remain substantially constant. Too great a change in intensity level within the edge gap indicates that the portion of the scan line being analyzed no longer represents a text region. In the preferred embodiment, the median level of the last edge discovered, MedianLevel, is used to identify too great a change in level within the edge gap.

Processor 34 prepares for both the edge gap and gap level tests during step 120 by calculating MedianLevel and the edge gap, EdgeGap. Preferably, processor 34 calculates the median intensity level according to the expression:

MedianLevel=(HighLevel+LowLevel)/2;

where MedianLevel is the median intensity level of the most recently discovered edge.

Preferably the edge gap is calculated using the expression:

EdgeGap=EdgeStartPos−TextEndPos.

Having calculated EdgeGap and MedianLevel, processor 34 branches from step 120 to step 122.

During step 122 processor 34 performs the edge gap test by determining whether EdgeGap exceeds MaxEdgeSpacing. If it does, the ending edge of the current text region has already been discovered, though it was not recognized as such at that time. Processor 34 responds to this situation by branching from step 122 to step 130. Discussion of the activities during step 130 will be deferred. On the other hand, if EdgeGap is not too large, the edge just discovered may be acceptable. To investigate that possibility processor 34 branches to step 124 from step 122.

During step 124 processor 34 determines whether the edge just located is a rising edge or falling edge. Actions dictated in response to rising and falling edges are analogous, consequently, description of steps 126, 128, and 129 will also serve to illustrate the actions of steps 134, 136, and 138. During steps 124 and 126 processor 34 determines whether the polarity of the edge just discovered differs from that of the previously discovered edge. If not, the edge just discovered is not part of the current text region because within text regions edge polarity alternates. In response processor 34 advances to step 130 from step 126. Discussion of step 130 will be discussed later. On the other hand, if the polarity of the just discovered edge is consistent with the current text region processor 34 branches to step 128 from step 126.

During step 128, in anticipation of the gap level test, processor 34 determines the maximum level within the edge gap, MaxLevel. Subsequently, during step 129 processor 34 performs the gap level test by comparing MaxLevel to MedianLevel. Processor 34 considers the edge just discovered part of the current text region if MaxLevel does not exceed MedianLevel. In response, processor 34 branches from step 129 to step 116 to continue searching for edges associated with the current text region. In contrast, if MedianLevel exceeds MaxLevel the edge just discovered is not part of the current text region. This means that processor 34 has already discovered the last edge of the current text region and possibly found the first edge of another text region. Processor 34 responds to this situation by exiting step 129 and branching to step 130.

Processor 34 advances to step 130 whenever it is determined that the edge just discovered is not a part of the current text region, regardless of whether that decision is made during steps 122, 126, 129, 134 or 138. During step 130 processor 34 determines whether the set of edges just discovered form a text region. Processor 34 has not discovered a text region if the set of edges includes less than the minimum number of edges, denoted MinEdges. The value to which MinEdges is set is a design choice. In the preferred embodiment MinEdges is set to two, insuring that each text region highlighted includes at least two edges. Processor 34 responds to a discovery of less than two edges by returning to step 114 from step 130 to begin searching for another text region. In contrast, when the set of edges just discovered includes more than MinEdges, then processor 34 has located a text region. Processor 34 advances from step 130 to step 132 to turn its attention to highlighting that text region.

C. Highlighting a Text Region

Processor 34 highlights the text region just discovered during step 132. First, processor 34 calculates the average pel intensity, denoted PelAvg, of the text region just discovered. Processor 34 uses the average pel intensity to calculate new intensity values for the pels of the scan line. Processor 34 modifies the value of each pel such that pels already darker than the average pel value become darker and pels already lighter than the average pel level become still lighter. Preferably, the new value for the pel, denoted NewValue, is expressed mathematically:

NewValue=PelAvg+N*(OldValue−PelAvg);

where:

OldValue is the intensity value of the pel prior to enhancement; and N is a constant.

N may be any arbitrary value that produces a visually pleasing image. In the preferred embodiment N is set equal to 2.

Preferably, processor 34 clamps NewValue at a maximum of 255 and a minimum of 0. After calculating NewValue processor 34 exits step 132 and returns to step 114 to search for another text region.

D. Response to the End of a Scan Line

At some point while searching for an edge during steps 112 and 118, the last pel of the scan line will be reached. As discussed before, if reached during step 152 this causes instructions 148 to return the message that an edge was not found. If processor 34 receives this message during step 112, no further action is required because the minimum number of edges required for a text region cannot have been found. Consequently, processor 34 simply branches from step 112 to step 144, thereby returning to the program which initiated execution of instructions 80. The situation differs if the no edge found message is returned during step 118. At least one edge has been discovered previously so the possibility exists that the minimum number of edges required to form a text region may have been found. In response, processor 34 advances to step 140 from step 118. During step 140 processor 34 determines whether the minimum number of edges have been discovered. If so, processor 34 branches to step 142 and modifies the pel values between TextStartPos and EdgeEndPos in the same manner discussed previously with respect to step 132. That done, processor 34 branches to step 144. Analysis and modification of the scan line complete, processor 34 couples to the selected output device, 20, 21, 26, or 28, the modified scan line, which includes all the new pel levels calculated while executing instructions 80.

IV. Summary

Thus, a method of segmenting text and image regions of a scan line signal and highlighting the text region has been described. The method begins by identifying a set of edges within the scan line signal. Next, it is determined whether the set of edges represent the bounds of a text region. If so, then an average pel intensity value is calculated for the text region. Afterward, the intensity of those pels within the text region whose values differ from the average are modified to produce a modified scan line signal. As a result, when the modified scan line signal is used to reproduce the scan line, the text is highlighted.

In the foregoing specification, the invention has been described with reference to specific exemplary embodiments thereof. It will, however, be evident that various modifications and changes may be made thereto without departing from the broader spirit and scope of the invention as set forth in the appended claims. Accordingly, the specification and drawings are to be regarded in an illustrative rather than a restrictive sense.

What is claimed is:

1. A method of highlighting a text region within a first scan line signal including an image region, the method using a processor executing instructions stored in a memory, coupled to the processor, the first scan line signal including a multiplicity of pels, each pel having a value indicative of an intensity, the processor being coupled to a reproduction device for reproducing scan line signals, the method comprising the processor implemented steps of:

a) identifying a set of edges of a possible text region represented by the values of pels of the first scan line signal;

b) determining whether the set of edges of the possible text region within the first scan line signal form a text region without reference to a second scan line signal;

c) if the set of edges within the first scan line signal forms a text region:
1) calculating an average intensity value of the text region;
2) changing the values of pels within the text region having values differing from the average intensity value of the text region to produce a modified scan line signal.

2. The method of claim 1 wherein step b) further comprises comparing a polarity of an edge of the set of edges to a polarity of an adjacent edge of the set of edges.

3. The method of claim 1 wherein step d) comprises determining whether a number of edges within the first scan line signal identified during step c) is at least three.

4. A method of highlighting a text region within a first scan line signal including an image region, the method using a processor executing instructions stored in a memory coupled to the processor, the first scan line signal including a multiplicity of pels, each pel having a value indicative of an intensity, the processor being coupled to a reproduction device for reproducing scan line signals, the method comprising the processor implemented steps of:

a) identifying a starting edge of a possible text region represented by the values of pels of the first scan line signal without reference to a second scan line signal;

b) determining whether a next edge is located within a predetermined distance of a closest, previously discovered, edge within the first scan line signal;

c) if the next edge is located within the predetermined distance of the closest, previously discovered edge within the first scan line signal:
1) comparing a polarity of the next edge to a polarity of the closest, previously discovered, edge within the first scan line signal;
2) if the polarity of the next edge differs from the polarity of the closest, previously discovered edge within the first scan line signal, repeating step c);

d) determining whether the starting edge and the next edges identified within the first scan line signal during step c) form a text region of the first scan line signal;

e) if the starting edge and the next edges identified during step d) form a text region of the first scan line signal:
1) calculating an average intensity value for pels within the text region of the first scan line signal;
2) changing the values of pels located within the text region of the first scan line signal having values differing from the average intensity value to produce a modified scan line signal.

* * * * *